US010414487B2

(12) United States Patent
Laurenceau et al.

(10) Patent No.: US 10,414,487 B2
(45) Date of Patent: Sep. 17, 2019

(54) COMPOSITE PROPELLER BLADE FOR AN AIRCRAFT

(71) Applicant: SAFRAN AIRCRAFT ENGINES, Paris (FR)

(72) Inventors: Adrien Laurenceau, Moissy-Cramayel (FR); Adrien Jacques Philippe Fabre, Moissy-Cramayel (FR); Matthieu Gimat, Portsmouth, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 326 days.

(21) Appl. No.: 14/903,434

(22) PCT Filed: Jun. 25, 2014

(86) PCT No.: PCT/FR2014/051595
§ 371 (c)(1),
(2) Date: Jan. 7, 2016

(87) PCT Pub. No.: WO2015/004362
PCT Pub. Date: Jan. 15, 2015

(65) Prior Publication Data
US 2016/0159460 A1    Jun. 9, 2016

Related U.S. Application Data

(60) Provisional application No. 61/843,505, filed on Jul. 8, 2013.

(51) Int. Cl.
*B64C 11/26* (2006.01)
*F01D 5/28* (2006.01)
(Continued)

(52) U.S. Cl.
CPC .............. *B64C 11/26* (2013.01); *B29C 70/24* (2013.01); *B29C 70/48* (2013.01);
(Continued)

(58) Field of Classification Search
CPC ......... B64C 11/16; B64C 11/20; B64C 11/22; B64C 11/24; B64C 11/26; F01D 5/12;
(Continued)

(56) References Cited

U.S. PATENT DOCUMENTS 4,971,641 A * 11/1990 Nelson .................... B64C 11/26
156/245
5,129,787 A   7/1992 Violette et al.
(Continued)

FOREIGN PATENT DOCUMENTS

| EP | 2540620 A1 | 1/2013 |
| FR | 2 985 940 A1 | 7/2013 |
| WO | 2012/001279 A1 | 1/2012 |

OTHER PUBLICATIONS

International Search Report dated Oct. 30, 2014 in PCT/FR2014/051595 filed Jun. 25, 2014.

*Primary Examiner* — David E Sosnowski
*Assistant Examiner* — Brian P Wolcott
(74) *Attorney, Agent, or Firm* — Oblon, McClelland, Maier & Neustadt, L.L.P.

(57) ABSTRACT

An aircraft propeller blade including a streamlined structure constituted by at least one piece of fiber reinforcement obtained by three-dimensionally weaving yarns and densified by a matrix, together with a spar including an enlarged portion extending outside the fiber reinforcement and forming the root of the blade, and a shaping portion present in a housing arranged inside the fiber reinforcement. The fiber reinforcement includes a non-interlinked zone forming the housing inside the fiber reinforcement. The non-interlinked zone opens out into the bottom portion and into the rear edge of the fiber reinforcement so as to form an opening for inserting the shaping portion of the spar into the housing of the fiber reinforcement. The opening present in the rear edge (Continued)

of the fiber reinforcement extends over a height that is less than the height of the housing.

6 Claims, 8 Drawing Sheets

(51) Int. Cl.
    *B29D 99/00*     (2010.01)
    *B29C 70/24*     (2006.01)
    *B29C 70/48*     (2006.01)
    *D03D 25/00*     (2006.01)
    *B29L 31/08*     (2006.01)
    *B29K 63/00*     (2006.01)
    *B29K 105/00*     (2006.01)
    *B29K 307/04*     (2006.01)

(52) U.S. Cl.
    CPC ....... B29D 99/0025 (2013.01); D03D 25/005 (2013.01); F01D 5/282 (2013.01); *B29K 2063/00* (2013.01); *B29K 2105/253* (2013.01); *B29K 2307/04* (2013.01); *B29K 2715/00* (2013.01); *B29L 2031/082* (2013.01); *Y02T 50/43* (2013.01)

(58) Field of Classification Search
    CPC .......... F01D 5/14; F01D 5/147; F03D 1/0633; F03D 1/065; F03D 1/0675; B29L 2031/08; B29L 2031/082; B29L 2031/085; B29L 2031/087; B29D 99/0025
    See application file for complete search history.

(56) References Cited

U.S. PATENT DOCUMENTS

| | | | |
|---|---|---|---|
| 5,222,297 A * | 6/1993 | Graff | B29C 70/865 |
| | | | 29/889.7 |
| 9,457,435 B2 * | 10/2016 | Mathon | B29C 70/48 |
| 2013/0017093 A1 | 1/2013 | Coupe et al. | |
| 2013/0177422 A1 | 7/2013 | Bianchi et al. | |
| 2013/0272893 A1 | 10/2013 | Fabre et al. | |
| 2016/0215789 A1 * | 7/2016 | Hui | F04D 29/023 |

* cited by examiner

COMPOSITE PROPELLER BLADE FOR AN AIRCRAFT

BACKGROUND OF THE INVENTION

The present invention relates to the field of aircraft propeller blades, such as those present on turboprops.

Propeller blades for turboprops are generally made of metal material. Although propeller blades made of metal material present good strength, they nevertheless present the drawback of being relatively heavy.

In order to obtain lighter blades, it is known to use propeller blades that are made of composite material, i.e. by making structural parts out of fiber reinforcement and a resin matrix.

Documents US 2013/0017093 and WO 2012/001279 describe making a propeller blade from a streamlined fiber structure into which a portion of a spar is inserted for the purpose of shaping the airfoil portion of the blade so as to form a propeller preform that is subsequently densified with a matrix. The fiber structure, which is made as a single piece by three-dimensional weaving, includes a non-interlinked zone serving to form a housing inside the fiber structure into which a shaping portion of the spar is inserted.

The propeller blade as obtained in that way presents both lower overall weight and considerable mechanical strength as a result of having a skin made of a composite material structure (i.e. fiber reinforcement densified by a matrix).

In order to impart good strength to the most exposed portion of the blade, i.e. its leading edge, the fiber structure does not include any opening or non-interlinked zone in those portions of the fiber structure that are to form the leading edge of the blade. The non-interlinked zone provided inside the fiber structure opens out both into the bottom edge and into the rear edge of the structure so as to form an opening that enables the shaping portion of the spar to be inserted into the inside of the fiber structure.

Nevertheless, in certain circumstances, such as for example when the blade is subjected to high levels of mechanical loading, to impacts, or to shocks, keeping the shaping portion in its reference position inside the densified fiber structure can be difficult, in particular at the rear edge of the fiber structure which is of reduced strength because of the presence of non-interlinking at this location in the fiber structure.

OBJECT AND SUMMARY OF THE INVENTION

It is therefore desirable to be able to provide an aircraft propeller blade of the above-described type, but that presents increased mechanical strength, in particular in terms of keeping the shaping portion of the spar in position inside the fiber structure of the blade.

For this purpose, the invention provides an aircraft propeller blade comprising a streamlined structure constituted by at least one piece of fiber reinforcement obtained by three-dimensionally weaving yarns and densified by a matrix, together with a spar including an enlarged portion extending outside the fiber reinforcement and forming the root of the blade, and a shaping portion present in a housing arranged inside the fiber reinforcement, the fiber reinforcement including a non-interlinked zone forming said housing inside the fiber reinforcement, the non-interlinked zone opening out into the bottom portion and into the rear edge of the fiber reinforcement so as to form an opening for inserting the shaping portion of the spar into the housing of the fiber reinforcement, the blade being characterized in that the opening present in the rear edge of the fiber reinforcement extends over a height that is less than the height of the housing so as to leave in said rear edge a retaining portion that comes at least in part into contact with the shaping portion of the spar.

By providing a retaining portion in this way in the rear edge, the shaping portion of the spar is held better in position inside the fiber reinforcement, and this applies in spite of the presence of a non-interlinked zone in the reinforcement. Even in the event of mechanical stresses (impacts, shocks) on the streamlined structure of the blade, there is no risk of the shaping portion moving inside the reinforcement since it is held beside the leading edge and beside the trailing edge of the blade by continuously woven portions of the reinforcement.

In a first aspect of the blade of the invention, the opening present in the rear edge of the fiber reinforcement extends over a height lying in the range 20% to 50% of the height of the housing.

In a second aspect of the blade of the invention, the retaining portion presents a width that decreases between the tip of the housing and the junction between said retaining portion and the opening present in the rear edge of the fiber reinforcement. Under such circumstances, the zone of contact between the shaping portion and the retaining portion preferably extends over a height lying in the range 20% to 50% of the height of the housing.

In a third aspect of the blade of the invention, the spar comprises a structural part of composite material and a part made of rigid cellular material adhesively bonded to a portion of the outline of the structural part.

The invention also provides an aeroengine including a plurality of blades of the invention.

The invention also provides an aircraft including at least one aeroengine of the invention.

Finally, the present invention provides a method of fabricating an aircraft propeller blade, the method comprising at least:

making a fiber blank as a single piece by three-dimensionally weaving yarns, said blank including a non-interlinked zone forming a housing inside the blank, said non-interlinked zone opening out into the bottom portion and into the rear edge of the fiber blank so as to form an opening;

making a spar including an enlarged portion extending outside the fiber blank and forming the root of the blade, and a shaping portion present in a housing formed inside the fiber reinforcement;

shaping the fiber blank by inserting the shaping portion of the spar into the housing in the fiber blank in order to obtain a preform for the streamlined structure; and densifying the preform with a matrix in order to obtain a streamlined structure having fiber reinforcement constituted by said preform and densified by the matrix;

the method being characterized in that the opening present in the rear edge of the fiber blank extends over a height that is less than the height of the housing so as to leave in said rear edge a retaining portion that comes at least in part into contact with the shaping portion of the spar.

In a first aspect of the method of the invention, the opening present in the rear edge of the fiber blank extends over a height lying in the range 20% to 50% of the height of the housing.

In a second aspect of the method of the invention, the retaining portion presents a width that decreases between the tip of the housing and the junction between said retaining portion and the opening present in the rear edge of the fiber blank. Under such circumstances, the zone of contact between the shaping portion and the retaining portion preferably extends over a height lying in the range 20% to 50% of the height of the housing.

In a third aspect of the method of the invention, the spar is made by fabricating a structural part of composite material and adhesively bonding a part made of rigid cellular material to a portion of the outline of said structural part.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general to various types of propeller for use with engines for aircraft such as airplanes or helicopters. An advantageous but non-exclusive application of the invention lies in propellers of large dimensions that, because of their size, present considerable weight having a significant impact on the overall weight of an aeroengine.

Figure 1:
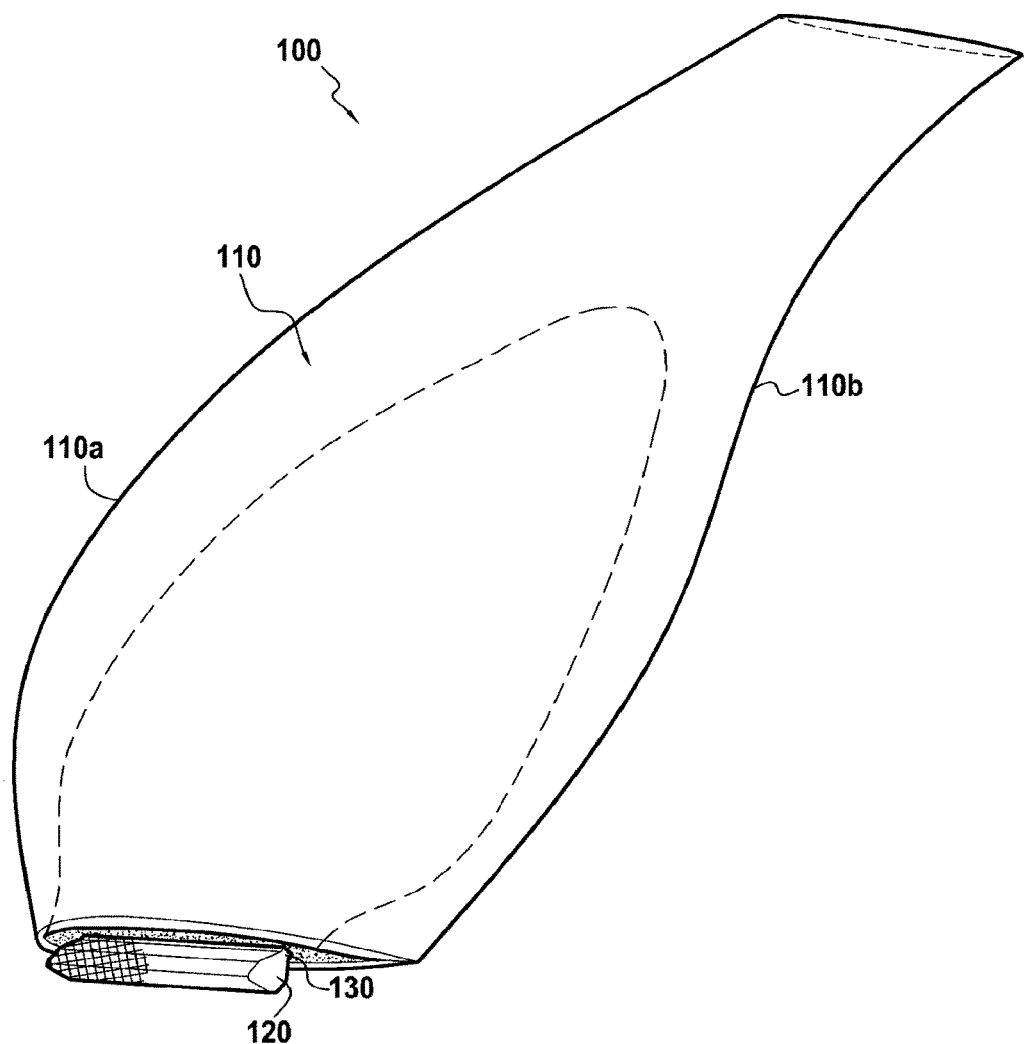
FIG. 1 is a perspective view of an aircraft propeller blade in accordance with an embodiment of the invention.

FIG. 1 shows a propeller blade 100 for mounting on an airplane turboprop, which blade comprises a streamlined structure 110 that is to form the airfoil of the blade, a root 120 formed by a portion of greater thickness, e.g. having a bulb-shaped section extended by a tang 130. In cross-section, the streamlined structure 110 presents a curved profile of thickness that varies between its leading edge 110a and its trailing edge 110b.

Figure 2:
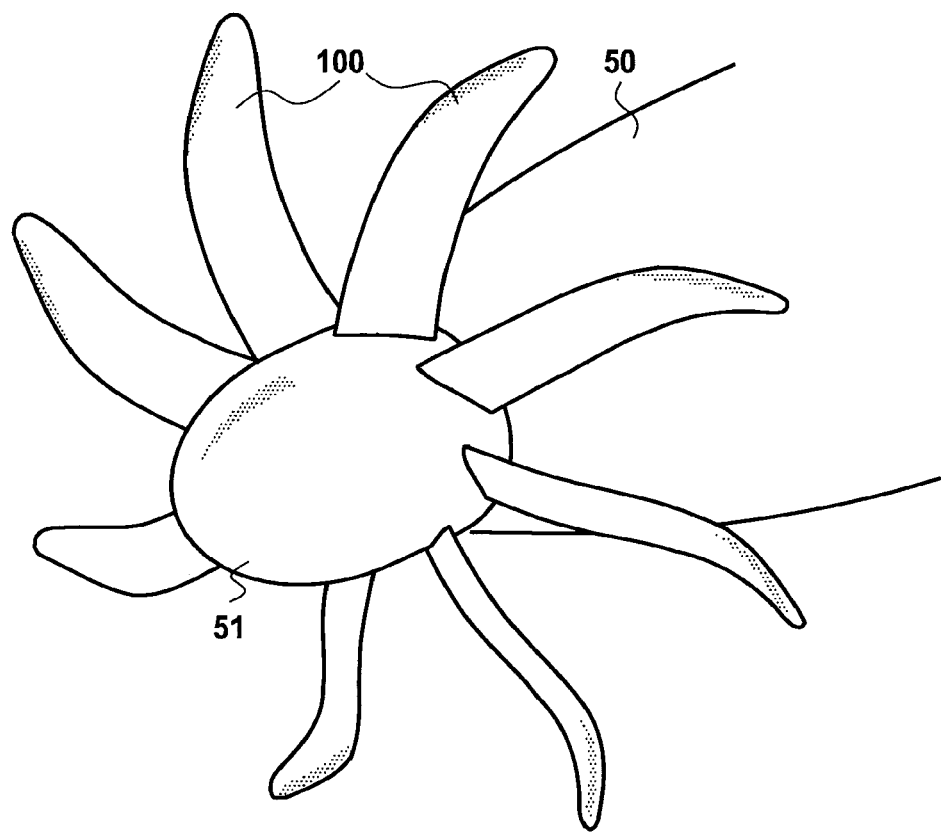
FIG. 2 is a perspective view of a turboprop fitted with a plurality of propeller blades of the invention.

As shown in FIG. 2, the propeller 100 is mounted on a rotor 51 of a turboprop 50 by engaging the blade roots 120 in respective housings formed in the periphery of the rotor 51 (not shown in FIG. 2).

Figure 3:
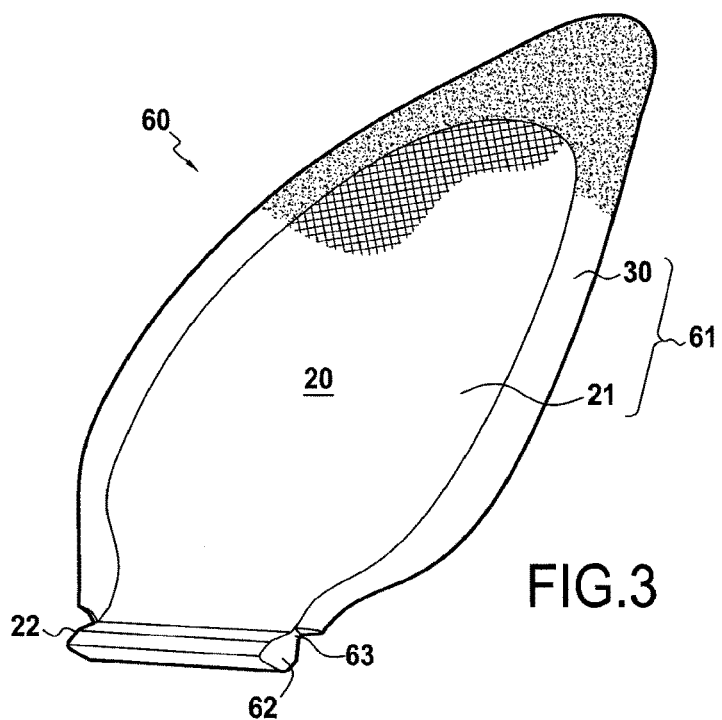
FIG. 3 is a perspective view of a spar used for fabricating the FIG. 1 propeller blade.

The method of fabricating a propeller of the invention comprises making a spar 60 as shown in FIG. 3 that is for inserting in part into a fiber blank that is to form the preform of the streamlined structure of the propeller blade. The spar 60 in this example is constituted by a structural part 20 and by a part made of rigid cellular material 30 that is adhesively bonded over a portion of the outline of the structural part.

The spar 60 has a shaping portion 61 corresponding in this example to a first portion 21 of the structural part and to the part made of rigid cellular material 30 that is adhesively bonded to said portion 21. The shaping portion 61 is for inserting into a housing of the fiber blank in order to form the preform of the airfoil structure as described in detail below. The spar 60 also has an enlarged portion 62 corresponding to the second portion 22 of the structural part 20, the enlarged portion 62 serving to form the root 120 of the propeller blade 10 (FIG. 1), the portion 63 that lies between the portions 61 and 62 serving to form the tang 130 of the propeller (FIG. 1).

The structural part 20 is made of composite material, i.e. from a fiber preform that is densified by a matrix. For this purpose, a fiber preform is made that is obtained, for example, by three-dimensional or multilayer weaving of carbon fiber yarns using an interlock weave. During the weaving of the fiber blank for the structural part 20, the second portion 22 may be obtained by using weft yarns of greater weight and additional layers of weft yarns, or by inserting an insert.

Once the preform for the structural part has been made, it is impregnated with a resin such as a bismaleimide (BMI) resin, which resin is then polymerized. These two operations may be performed using the resin transfer molding (RTM) technique as described below. After the resin has polymerized, the spar is machined to its final dimensions.

The part 30 that is to co-operate with the first portion 21 of the structural part 20 is made of rigid cellular material, i.e. a material that presents low density in order to avoid increasing the weight of the final blade. The part 30 may be made by molding or by machining a block of material, e.g. a plate of foam sold under the reference Rohacell® 110 XTHT.

The portion 21 of the structural part 20 and the part 30 are of complementary shapes that make it possible, once they have been assembled together, to define a shaping portion 61 having a shape that corresponds to the shape of the streamlined structure of the propeller blade that is to be made. The structural part 20 and the part 30 made of rigid cellular material are adhesively bonded together before being inserted into the fiber blank for the blade.

In a variant embodiment, the spar may be constituted entirely by a structural part of composite material (i.e. without a part made of rigid cellular material).

Figure 4:
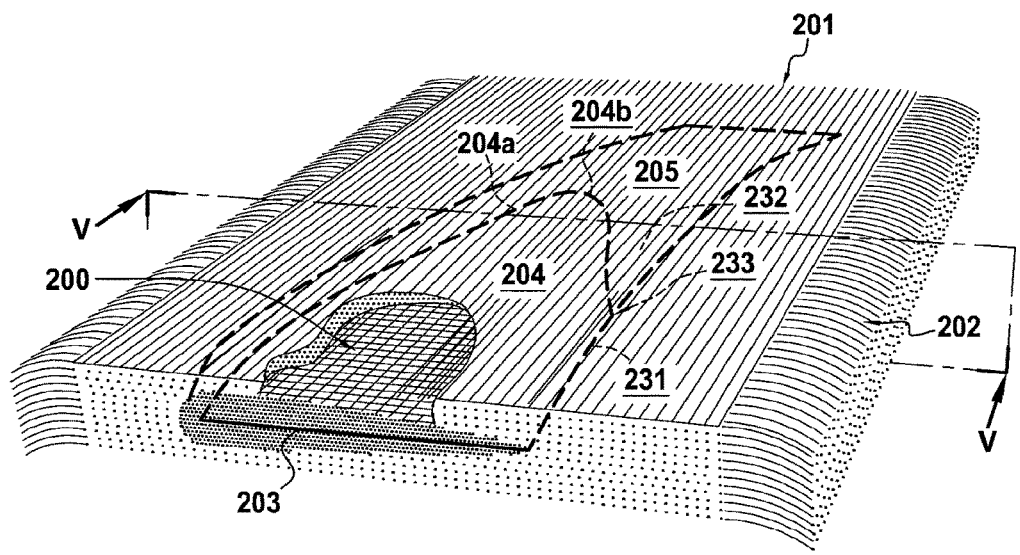
FIG. 4 is a diagrammatic view showing the 3D weaving of a fiber blank for fabricating the FIG. 1 propeller.

FIG. 4 is a highly diagrammatic view of a fiber blank 200 for forming the fiber preform of the streamlined structure of the propeller blade that is to be made.

As shown diagrammatically in FIG. 4, the fiber blank 200 is obtained by three-dimensional (3D) weaving performed in conventional manner by means of a Jacquard type loom that has a bundle of warp yarns 201 or twisted strands arranged thereon in a plurality of layers having several hundreds of yarns each, with the warp yarns being interlinked by weft yarns 202.

In the example shown, the 3D weaving is weaving with an interlock weave. The term "interlock" weaving is used herein to mean a weave in which each layer of weft yarns interlinks a plurality of layers of warp yarns with all of the yarns of a given weft column having the same movement in the weave plane.

Other known types of three-dimensional weaving could be used, such as those described in document WO 2006/136755, the content of which is incorporated herein by way of reference. That document describes in particular how to make single-piece fiber reinforcing structures for parts such as blades or vanes having a first type of weave in a core and a second type of weave in a skin, thereby making it possible simultaneously to impart both the desired mechanical properties and the desired aerodynamic properties to a part of that type.

The fiber blank of the invention may be woven in particular using carbon fibers or ceramic fibers, such as silicon carbide fibers.

As the weaving of the fiber blank progresses, with the thickness and the width of the blank varying, a certain number of warp yarns are left out of the weaving, thereby making it possible to define the desired continuously-varying outline and thickness for the blank 200. An example of varying 3D weaving that makes it possible in particular to vary the thickness of the blank between a first edge that is to form the leading edge and a second edge of smaller thickness that is to form the trailing edge is described in document EP 1 526 285, the content of which is incorporated herein by way of reference.

During weaving, two successive layers of warp yarns are not interlinked at 203 (FIG. 4) within the fiber blank over a non-interlinking zone 204 that is defined by an outline 204a between said non-interlinked zone 204 and an interlinked zone 205 in the fiber blank. The non-interlinked zone 204 makes it possible to form a housing 206 (FIG. 7) matching the dimensions of the shaping portion 61 of the spar 60 inside the fiber blank 200 in order to form the blade preform (FIG. 8).

Figure 5:
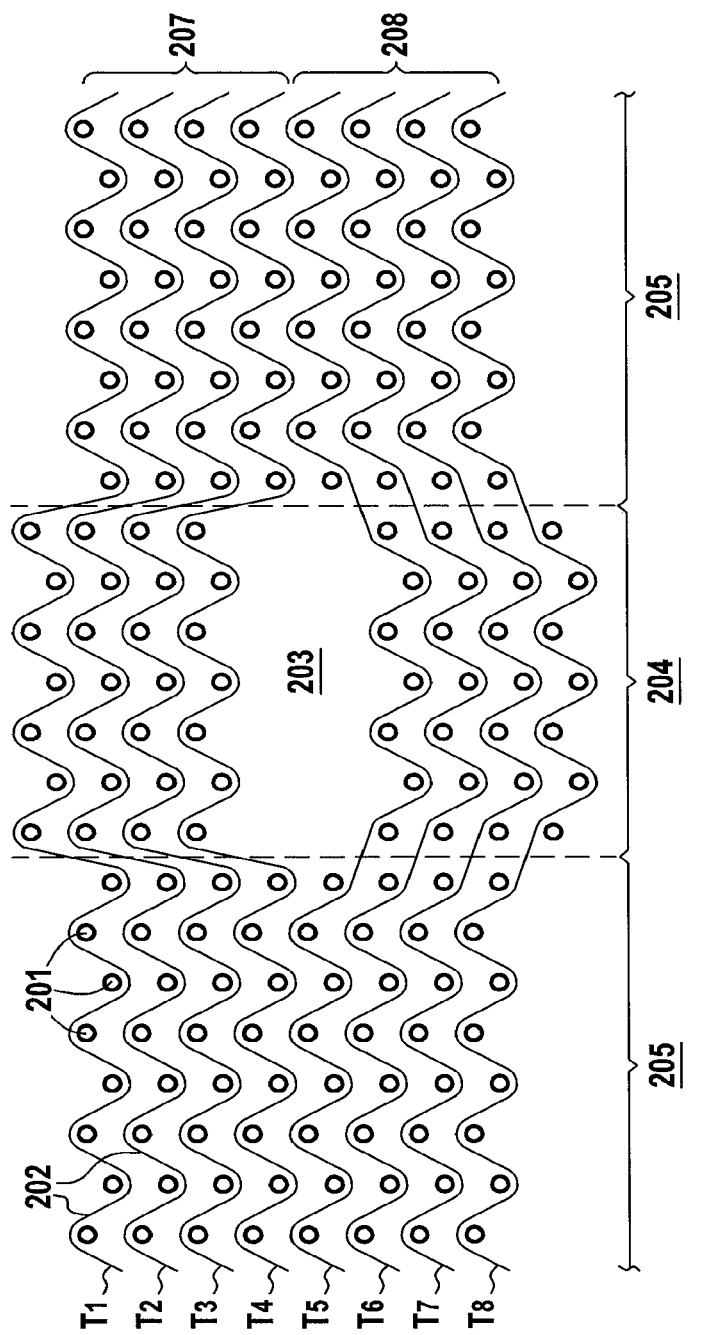
FIG. 5 is a fragmentary section view on a larger scale of a set of yarn layers, showing how a zone of non-interlinking is formed in the FIG. 4 blank.

One way of performing 3D weaving with an interlock weave for the blank 200 is shown diagrammatically in FIG. 5. FIG. 5 is an enlarged fragmentary view of a warp section plane in a portion of the blank 200 that includes the non-interlinked zone 204 (section V-V in FIG. 4). In this example, the blank 200 has eight layers of warp yarns 201 extending in the direction X. In FIG. 5, the eight layers of warp yarns are interlinked by weft yarns $T_1$ to $T_8$ in the interlinked zones 205 of the fiber blank 200. In the non-interlinked zone 204, the four layers of warp yarns 201 forming the set 207 of yarn layers are interlinked by four weft yarns $T_1$ to $T_4$, as are the four layers of warp yarns forming the set 208 of yarn layers that are interlinked by the four weft yarns $T_5$ to $T_8$. In other words, the fact that the weft yarns $T_1$ to $T_4$ do not extend into the set 208 of yarn layers and the weft yarns $T_5$ to $T_8$ do not extend into the set 207 of yarn layers provides the non-interlinking 203 that separates the two sets 207 and 208 of warp yarn layers from each other.

Figure 6:
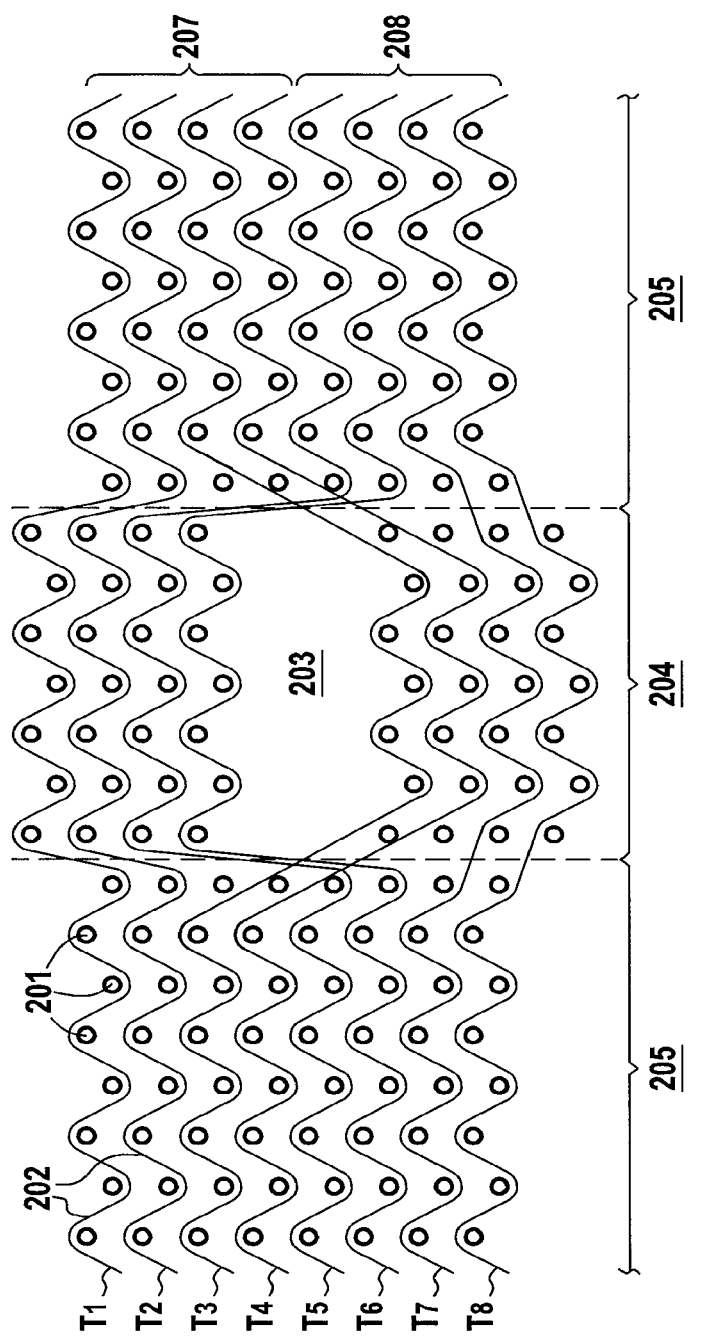
FIG. 6 is a fragmentary section view on a larger scale of a set of yarn layers showing a variant way of making a zone of non-interlinking in the FIG. 4 blank.

In the non-interlinked zone 204 in the weaving example shown in FIG. 5, the weft yarns $T_1$ to $T_4$ and the weft yarns $T_5$ to $T_8$ are arranged on respective sides of the non-interlinking 203, with the weft yarns $T_1$ to $T_4$ interlinking the first four layers of warp yarns forming the yarn layer set 207, and the weft yarns $T_5$ to $T_8$ interlinking the last four layers of warp yarns forming the yarn layer set 208. In a variant embodiment shown in FIG. 6, one or more weft yarns interlinking the warp yarn layers forming the yarn layer set 207 in the interlinked zones 205 are used for interlinking the warp yarn layers forming the yarn layer set 208 in the interlinked zone 205, and vice versa. More precisely, and as shown in FIG. 6, the weft yarns $T_3$ and $T_4$ interlinking the warp yarn layers of the yarn layer set 207 in the first interlinked zone 205 are deflected on entering into the non-interlinked zone 204 to interlink warp yarn layers of the yarn layer set 208. Likewise, the weft yarns $T_5$ and $T_6$ interlinking warp yarn layers in the yarn layer set 208 in the first interlinked zone 205 are deflected on entering into the non-interlinked zone 204 in order to interlink warp yarn layers of the yarn layer set 207. After the non-interlinked zone 204, the weft yarns $T_3$ and $T_4$ are once more deflected on entering into the second interlinked zone 205 in order to interlink warp yarn layers of the yarn layer set 208, while the weft yarns $T_5$ and $T_6$ are once more deflected on entering into the second interlinked zone 205 to interlink warp yarn layers of the yarn layer set 207. Crossing over the weft yarns $T_3$ and $T_4$ and the weft yarns $T_5$ and $T_6$ at the beginning and at the end of the non-interlinked zone 204 serves to improve the strength of the fiber blank in the non-interlinked zone.

Figure 7:
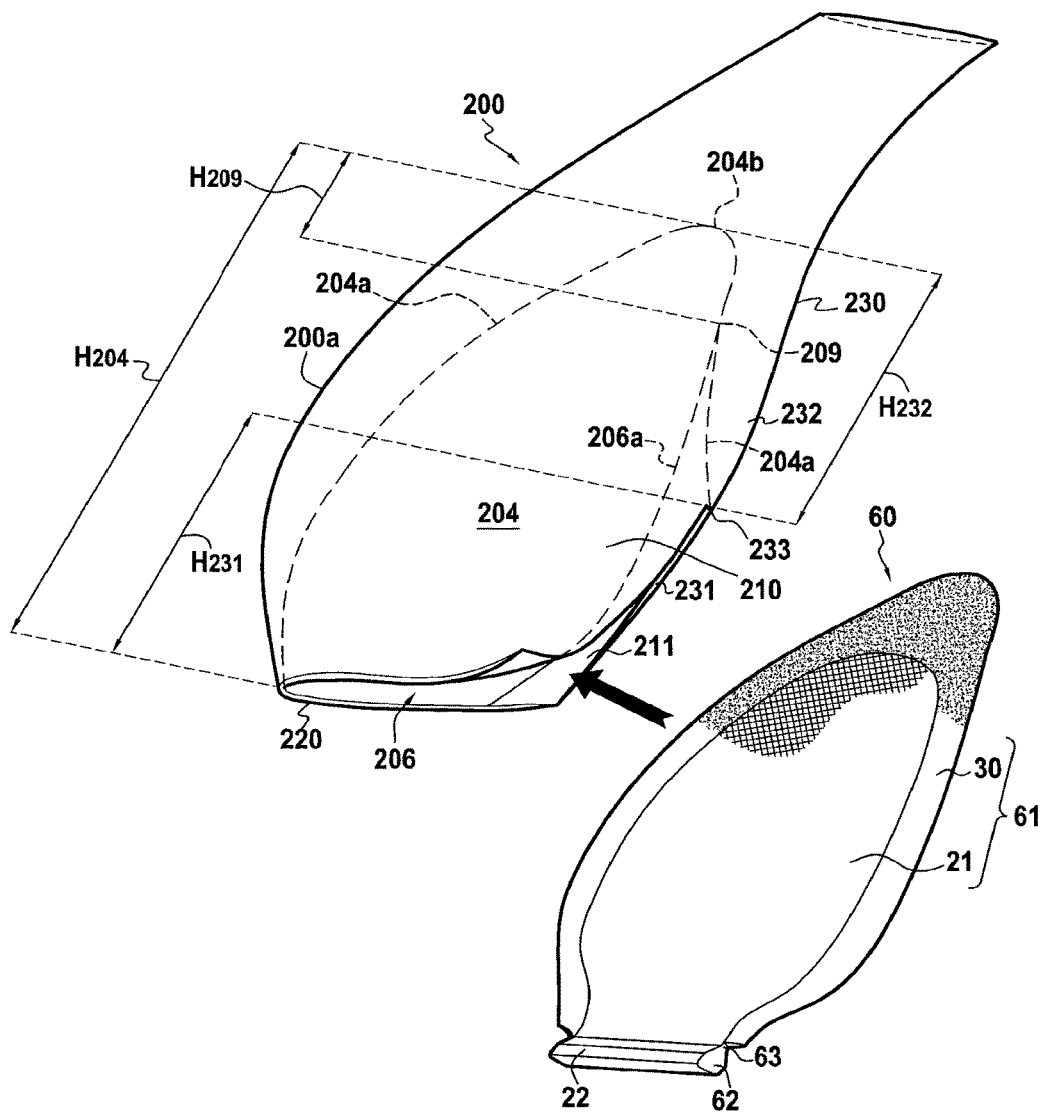
FIG. 7 is a perspective view showing the insertion of the portion for shaping the FIG. 3 spar into the fiber blank of FIG. 4.
Figure 8:
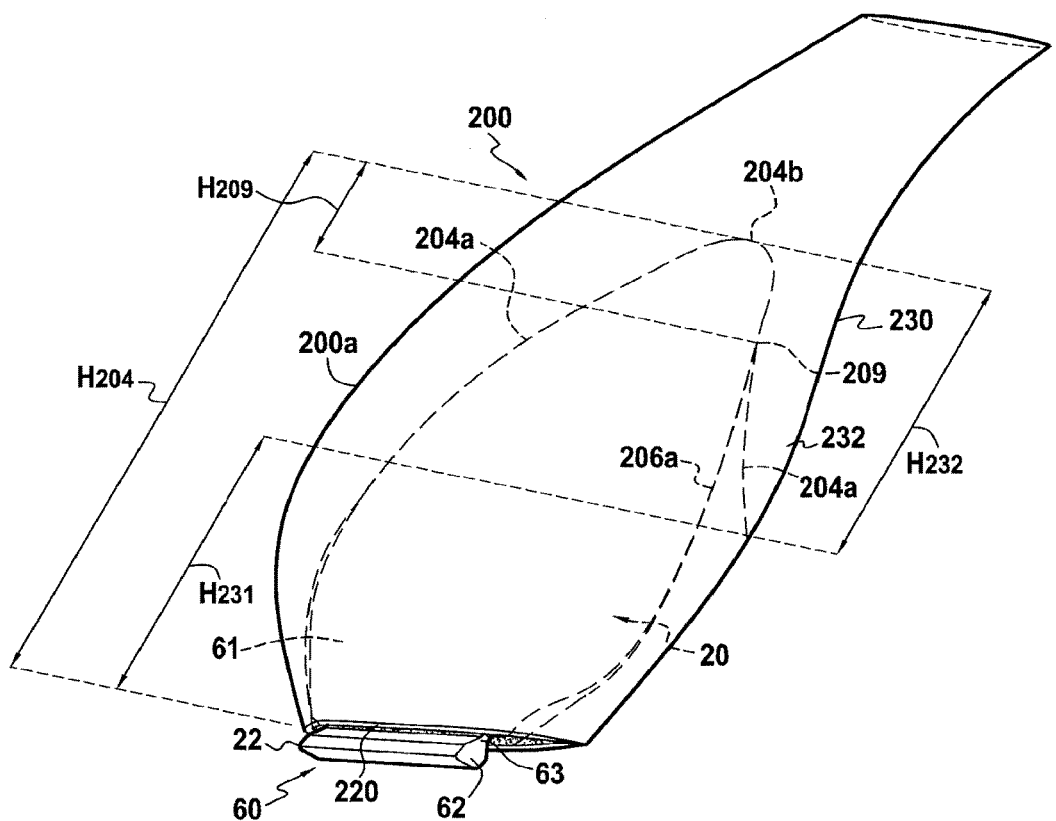
FIG. 8 is a perspective view showing the blade preform prior to densification performed in order to make the FIG. 1 propeller blade.

At the end of weaving (FIG. 4), the warp yarns and the weft yarns at the surface of the woven mass are cut through, e.g. by means of a jet of water under pressure, in order to extract the blank 200 as shown in FIG. 7 as it results from the 3D weaving and prior to any shaping. The non-interlinked zone 204 that is provided during weaving serves to form two portions 210 and 211 that are independently woven and between which there extends the housing 206 inside the blank 200. The housing 206 is open to the bottom edge 220 and to the rear edge 230 of the blank 200. The rear edge 230 of the blank 200 corresponds to the portion that is to form the trailing edge 110b of the propeller blade 100 (FIG. 1).

In accordance with the invention, the rear edge 230 presents a partial opening 231 that extends from the bottom edge 220 over a height $H_{231}$ that is less than the height $H_{204}$ over which the non-interlinked zone 204 extends inside the fiber blank 200 (FIG. 7), where the height $H_{204}$ of the non-interlinked zone extends between the bottom edge 220 and a tip 204b of the non-interlinked zone 204 of the blank 200, which tip 204b also corresponds to the tip of the housing 206. The height $H_{204}$ also corresponds to the height of the housing 206 in which the shaping portion 61 of the spar 60 is placed (FIG. 8). This partial opening 231 in the rear edge 230 makes it possible to provide a closed portion 232, referred to as a "retaining" portion 232, in the rear edge 230 of the blank, which portion extends over a height $H_{232}$ lying between the end of the partial opening 231 and the tip 204b of the non-interlinked zone 204 in the blank 200.

The retaining portion 232 is obtained by forming the non-interlinked zone 204 over a varying length of warp yarns in the vicinity of the rear edge 230. More precisely, and as shown in FIG. 4, the warp yarns 201 present in the retaining portion 232, i.e. those present between the tip 204b of the non-interlinked zone 204 and the rear edge 230 of the blank, are interlinked by weft yarns 202 starting from the portion of the blank 200 that is situated at the junction 233 between the partial opening 231 and the retaining portion 232. Between the junction 233 and the tip 204b, the number of woven warp yarns in the width direction of the blank is increased progressively so as to obtain a retaining portion 232 of width that increases between the junction 233 and the tip 204b.

The height $H_{231}$ of the partial opening 231 preferably lies in the range 20% to 50% of the total height $H_{204}$ of the housing 206, this making it possible to have an opening in the fiber blank that is sufficient to enable the shaping portion of the spar to be inserted while also providing a retaining portion that is suitable for reinforcing the strength of the spar in the blank and consequently for increasing the mechanical strength of the resulting propeller blade.

In the example shown in FIGS. 7 and 8, the outline a 204a of the non-interlinked zone 204 separates progressively from the outline 206a of the housing 206 starting from a point 209 and going to the junction 233. This produces a retaining portion 232 that presents a width that decreases progressively between the tip 204b and the junction 233. This makes it possible to form the retaining portion 232 while making it easier to insert the shaping portion 61 of the spar 60 into the housing 206 in the fiber blank 200. Once it has been inserted in the housing 204 of the fiber blank 200, the shaping portion 61 of the spar 60 is in contact with the retaining portion 232 over only a zone extending between the tip 204b and the point 209. In order to ensure that the shaping portion is retained sufficiently in the fiber blank, the height $H_{209}$ of the contact zone between the shaping portion 61 and the retaining portion 232 preferably lies in the range 20% to 50% of the total height $H_{204}$ of the housing 204.

Figure 9:
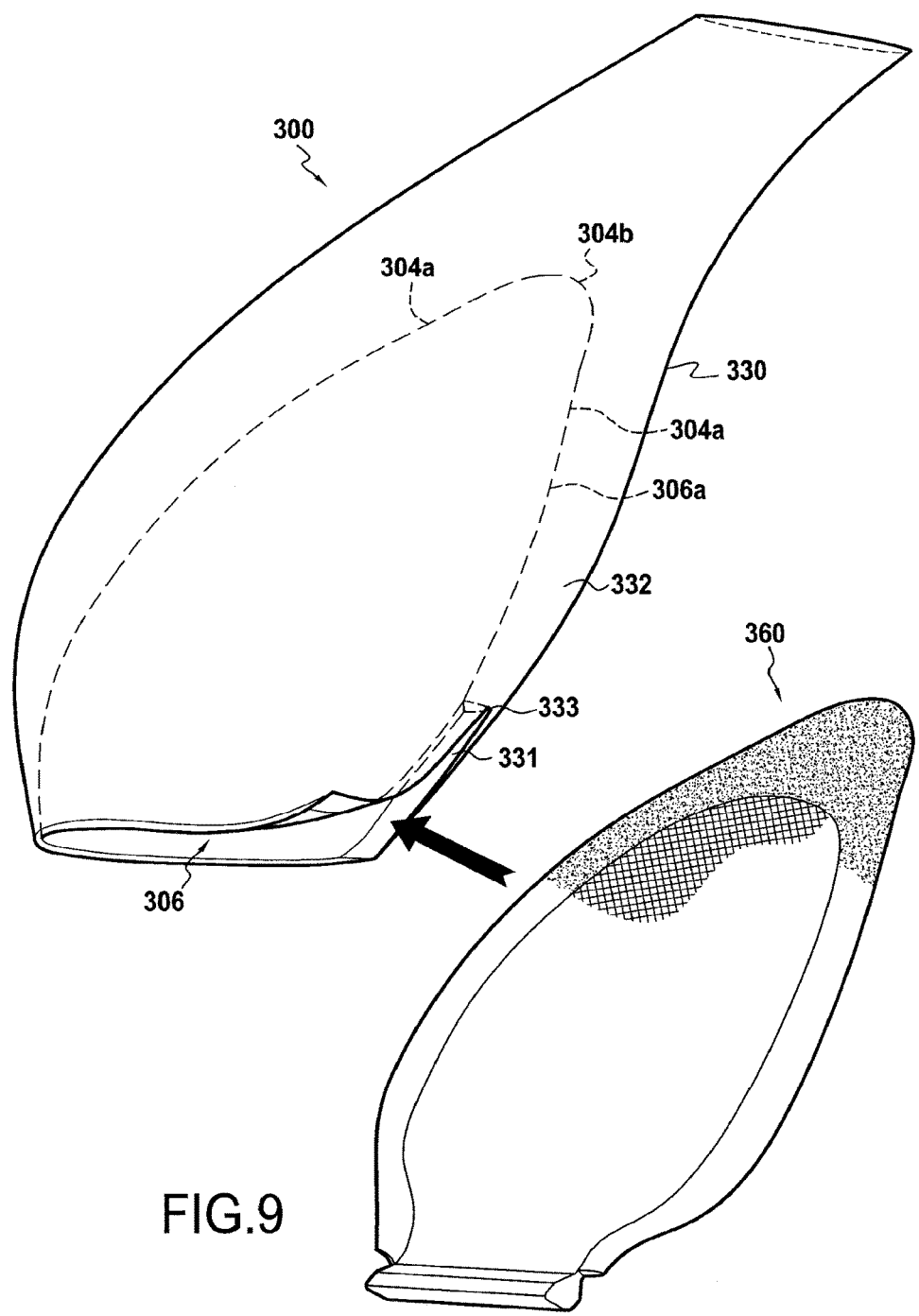
FIG. 9 is a perspective view showing a variant way of making a fiber blank in accordance with another implementation of the invention.

When it is desired to give priority to the mechanical strength of the propeller, and in particular to the retention of the shaping portion in the blade preform, over ease of inserting the shaping element, a retaining portion should be made that is adjacent to the outline of the housing at the rear edge of the fiber blank. Such a variant embodiment is shown in FIG. 9, which shows a fiber blank 300 having a retaining portion 332 and a partial opening 331 in the rear edge 330 of the blank 300. The retaining portion 332 in this example is adjacent to the outline 306a of a housing 306 for receiving a shaping portion 361 of a spar 360 that is identical to the above-described spar 60. Under such circumstances, the non-interlinked zone 304 is shaped during weaving of the blank 300 in such a manner that its outline 304a coincides with the outline 306a of the housing 306 between the tip 304b of the non-interlinked zone and the junction 333 situated between the partial opening 331 and the retaining portion 332. The height of the partial opening 331 preferably lies in the range 20% to 50% of the total height of the housing 304, thus making it possible to have an opening in the fiber blank that is sufficient to enable the shaping portion of the spar to be inserted, while providing a retaining portion that is suitable for reinforcing the strength of the spar in the blank and consequently for increasing the strength of the resulting propeller blade.

In FIG. 7, the fiber blank 200 is shaped into a blade preform by inserting the shaping portion 61 of the spar 60 into the housing 206.

Once the shaping portion 61 has been inserted into the housing 206, as shown in FIG. 8, the fiber preform of the blade is densified. The rear edge 230 and the bottom edge 220 of the blank are preferably reclosed by stitching prior to densification.

Densification of the fiber preform consists in filling the pores of the preform, throughout all or only part of its volume, by means of the material that constitutes the matrix.

The matrix of the composite material constituting the streamlined structure may be obtained in known manner using the liquid technique.

The liquid technique consists in impregnating the preform with a liquid composition that contains an organic precursor for the material of the matrix. The organic precursor is usually in the form of a polymer, such as a resin, possibly diluted in a solvent. The preform is placed in a mold that can be closed in leaktight manner so as to have a cavity with the shape of the final molded part and capable in particular of presenting a twisted shape corresponding to the final shape of the blade. Thereafter, the mold is closed and the liquid precursor of the matrix (e.g. a resin) is injected into all of the cavity so as to impregnate all of the fiber portion of the preform.

The precursor is transformed into an organic matrix, i.e. it is polymerized, by performing heat treatment, generally by heating the mold, after eliminating any solvent and after curing the polymer, with the preform continuing to be held in the mold having a shape that corresponds to the shape of the propeller blade. The organic matrix may in particular be obtained using epoxy resins, such as the high-performance epoxy resin sold under the reference PR 520 by the supplier Cytec, or from liquid precursors for carbon or ceramic matrices.

When forming a carbon or ceramic matrix, the heat treatment consists in pyrolyzing the organic precursor in order to transform the organic matrix into a carbon or ceramic matrix depending on the precursor used and on pyrolysis conditions. By way of example, liquid precursors for carbon may be resins having a high coke content, such as phenolic resins, whereas liquid precursors for ceramic, in particular for SiC, may be resins of the polycarbosilane (PCS) type, or of the polytitanocarbosilane (PTSC) type, or of the polysilazane (PSZ) type. Several consecutive cycles from impregnation to heat treatment may be performed in order to achieve the desired degree of densification.

According to an aspect of the invention, the fiber preform may be densified by the well-known RTM method. In the RTM method, the fiber preform is placed in a mold having the outside shape of the blade. Since the shaping portion 61 is made up of parts that are rigid and that have a shape that corresponds to the shape of the blade that is to be made, it acts advantageously as a countermold. A thermosetting resin is injected into the inside space defined between the part made of rigid material and the mold, which space contains the fiber preform. A pressure gradient is generally established in this inside space between the location where the resin is injected and discharge orifices for the resin, so as to control and optimize impregnation of the preform by the resin.

By way of example, the resin used may be an epoxy resin. Resins that are suitable for RTM methods are well known. They preferably present low viscosity in order to make them easier to inject into the fibers. The temperature class and/or the chemical nature of the resin are selected as a function of the thermodynamic stresses to which the part is to be subjected. Once the resin has been injected throughout the reinforcement, it is polymerized by heat treatment into compliance with the RTM method.

After injection and polymerization, the part is unmolded. In the end, the part is trimmed in order to remove excess resin and chamfers are machined thereon. No other machining is needed since, given that the part is molded, it complies with the required dimensions.

The rigid cellular material used for making the part 30 is preferably a material having closed cells so as to prevent the resin from penetrating into them, and thus conserve its low density after the fiber preform has been densified.

After the fiber preform has between densified, a propeller blade 100 is obtained as shown in FIG. 1.

The invention claimed is:

1. An aircraft propeller blade comprising:
   a fiber reinforcement obtained by three-dimensionally weaving yarns and densified by a matrix; and
   a spar including an enlarged portion extending outside the fiber reinforcement and forming a root of the aircraft propeller blade, and a shaping portion present in a housing arranged inside the fiber reinforcement,
   the fiber reinforcement including
      a non-interlinked zone forming said housing inside the fiber reinforcement, dimensions of the housing matching dimensions of the shaping portion of the spar, the non-interlinked zone opening out into a bottom portion of the fiber reinforcement and into a rear edge of the fiber reinforcement so as to form an opening for inserting the shaping portion of the spar into the housing of the fiber reinforcement, and
      an interlinked zone, wherein the opening in the rear edge of the fiber reinforcement extends between the bottom portion of the fiber reinforcement and a junction on the rear edge of the fiber reinforcement such that a height of the opening is less than a height of the housing so as to leave in said rear edge a retaining portion formed in the interlinked zone that comes at least partly into contact with the shaping portion of the spar, wherein the interlinked zone on the rear edge of the fiber reinforcement extends between the junction and a tip of the fiber reinforcement, wherein the non-interlinked zone is defined by an outline between the non-interlinked zone and the interlinked zone, wherein the outline of the non-interlinked zone separates progressively from an outline of the housing starting from a predetermined point and going to the junction such that the retaining portion presents a width that decreases between a tip of the housing and the junction, wherein a height between the predetermined point and the tip of the housing is 20% to 50% of the height of the housing, and wherein the height of the opening is 20% to 50% of the height of the housing.

2. The aircraft propeller blade according to claim 1, wherein the spar comprises a structural part of composite material and a part made of rigid cellular material adhesively bonded to a portion of an outline of the structural part.

3. An aeroengine having a plurality of aircraft propeller blades according to claim 1.

4. An aircraft including at least one aeroengine according to claim 3.

5. A method of fabricating an aircraft propeller blade, the method comprising:

making a fiber blank as a single piece by three-dimensionally weaving yarns, said fiber blank including an interlinked zone and a non-interlinked zone forming a housing inside the fiber blank, said non-interlinked zone opening out into a bottom portion of the fiber blank and into a rear edge of the fiber blank so as to form an opening;

making a spar including an enlarged portion extending outside the fiber blank and forming a root of the aircraft propeller blade, and a shaping portion, the shaping portion of the spar being present in the housing formed inside the fiber blank, dimensions of the shaping portion of the spar matching dimensions of a shaping portion of the housing;

shaping the fiber blank by inserting the shaping portion of the spar into the housing in the fiber blank via the opening in order to obtain a preform; and densifying the preform with a matrix in order to obtain a streamlined structure constituted by said preform and densified by the matrix, wherein the opening in the rear edge of the fiber blank extends between the bottom portion of the fiber blank and a junction on the rear edge of the fiber blank such that a height of the opening is less than a height of the housing so as to leave in said rear edge a retaining portion formed in the interlinked zone that comes at least partly into contact with the shaping portion of the spar, wherein the interlinked zone on the rear edge of the fiber blank extends between the junction and a tip of the fiber blank, wherein the non-interlinked zone is defined by an outline between the non-interlinked zone and the interlinked zone, wherein the outline of the non-interlinked zone separates progressively from an outline of the housing starting from a predetermined point and going to the junction such that the retaining portion presents a width that decreases between a tip of the housing and the junction, wherein a height between the predetermined point and the tip of the housing is 20% to 50% of the height of the housing, and wherein the height of the opening is 20% to 50% of the height of the housing.

6. The method according to claim 5, wherein the spar is made by fabricating a structural part of composite material and adhesively bonding a part made of rigid cellular material to a portion of an outline of said structural part.

* * * * *